United States Patent
Sikri et al.

(10) Patent No.: US 10,645,085 B2
(45) Date of Patent: May 5, 2020

(54) DEVICE MANAGEMENT ACROSS MULTIPLE OPERATOR NETWORKS

(71) Applicant: Cisco Technology, Inc., San Jose, CA (US)

(72) Inventors: Deepika Sikri, Milpitas, CA (US); Pallavi Vanacharla, Foster City, CA (US); Marc Austin, Seattle, WA (US); Suvitha Kesavan, San Jose, CA (US); Suparna Kumar, San Jose, CA (US); Blair David Martin, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 256 days.

(21) Appl. No.: 15/446,985

(22) Filed: Mar. 1, 2017

(65) Prior Publication Data

US 2018/0255061 A1   Sep. 6, 2018

(51) Int. Cl.
*H04L 29/06* (2006.01)

(52) U.S. Cl.
CPC .............. *H04L 63/10* (2013.01); *H04L 63/08* (2013.01); *H04L 63/20* (2013.01); *H04L 63/205* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| | | | | |
|---|---|---|---|---|
| 9,059,939 | B2* | 6/2015 | Garimella | H04L 41/5054 |
| 9,064,289 | B2* | 6/2015 | Livshits | G06Q 50/10 |
| 2012/0173679 | A1* | 7/2012 | Li | H04L 67/2823 |
| | | | | 709/220 |
| 2013/0066986 | A1* | 3/2013 | DiCosola | G06Q 10/10 |
| | | | | 709/206 |
| 2013/0290531 | A1* | 10/2013 | Azlin | H04L 67/16 |
| | | | | 709/225 |

FOREIGN PATENT DOCUMENTS

WO   2011114536   6/2013

\* cited by examiner

*Primary Examiner* — Sharif E Ullah
(74) *Attorney, Agent, or Firm* — Behmke Innovation Group LLC; James M. Behmke; Jonathon P. Western

(57) ABSTRACT

Various implementations disclosed herein enable a method of managing device access on one or more operator networks. The method includes determining correspondence between a first adaptor module of a plurality of adaptor modules and a first request to manage devices deployed on a first operator network associated with the first adaptor module. The first request conforms to a first interface. The method includes converting, by the first adaptor module, the first request into a second request that conforms to a second interface provided by an operator entity associated with the first operator network. The second interface is configured to mask network elements of the first operator network in order to prevent direct communication with the network elements. The method includes transmitting the second request to the operator entity via the second interface. The transmitting satisfies a security criterion to shield the network elements from the device management system.

16 Claims, 5 Drawing Sheets

DEVICE MANAGEMENT ACROSS MULTIPLE OPERATOR NETWORKS

TECHNICAL FIELD

The present disclosure relates generally to device management, and in particular, to management of devices accessing and operable on multiple operator networks.

BACKGROUND

An enterprise typically utilizes numerous devices (e.g., mobile devices). For example, in some enterprises, employees have and/or are assigned devices that the employees use to perform their duties within the enterprise. The devices typically include mobile communication devices that are deployed on an operator network, such as smartphones, tablet computers, and laptop computers. Due to the variety of operator networks that are available, devices affiliated with an enterprise are usually deployed on different operator networks. Furthermore, an enterprise typically has numerous digital assets. Examples of digital assets include documents, presentations, software, videos, digital currency, etc. The devices affiliated with an enterprise are typically capable of accessing the digital assets of the enterprise. However, most of the digital assets of an enterprise are considered confidential. As such, an enterprise has a need to manage device access.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
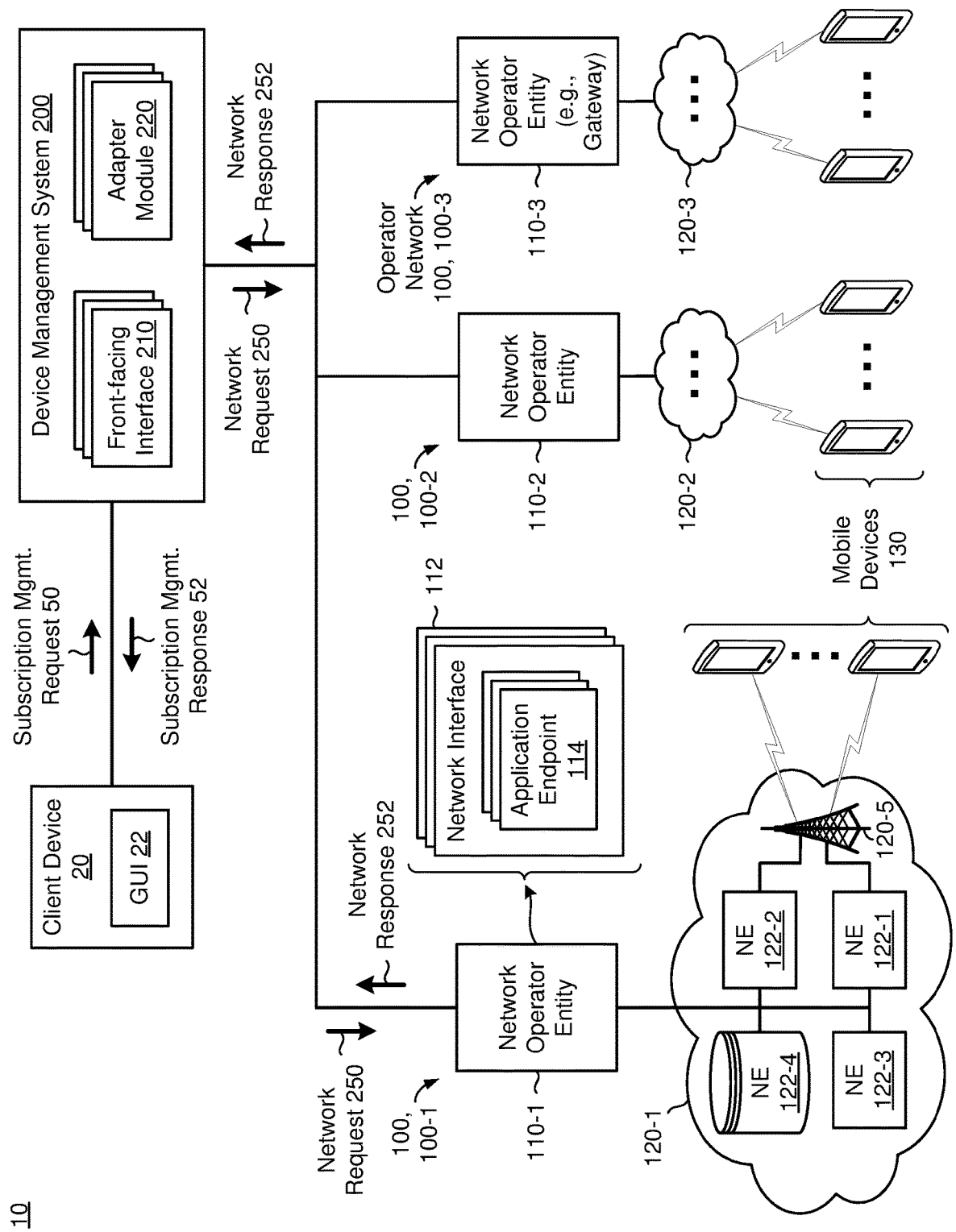
FIG. 1 is a schematic diagram of a device management environment that includes a device management system in communication with one or more operator networks in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable managing device access (e.g., mobile device access) on one or more operator networks (e.g., mobile networks such as cellular networks, permissioned Wi-Fi networks, and/or various Local Area Networks (LANs) and Wide Area Networks (WANs)). For example, in various implementations, a method of managing device access on one or more operator networks is performed by a device management system. In various implementations, the device management system includes a non-transitory memory and one or more processors. In various implementations, the method includes determining correspondence between a first adaptor module of a plurality of adaptor modules and a first request to manage operator network access of one or more devices deployed on a first operator network associated with the first adaptor module. In various implementations, the first request conforms to a first interface (e.g., a front-facing interface). In various implementations, the method includes converting, by the first adaptor module, the first request into a second request that conforms to a second interface provided by an operator entity associated with the first operator network. In various implementations, the second interface is configured to mask network elements of the first operator network in order to prevent the device management system from directly communicating with the network elements. In various implementations, the method includes transmitting the second request to the operator entity via the second interface. In various implementations, the transmitting satisfies a first operator network security criterion to shield the network elements of the first operator network from the device management system.

EXAMPLE EMBODIMENTS

FIG. 1 is a schematic diagram of a device management environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the device management environment 10 includes a client device 20 (e.g., an administrator device associated with an enterprise), one or more operator networks 100 (e.g., operator networks 100-1, 100-2, 100-3 . . . ), various devices 130 that are deployed across the operator networks 100, and a device management system 200. In various implementations, an operator network 100 includes a mobile network such as a cellular network, a permissioned Wi-Fi network, a Local Area Network (LAN), and/or a Wide Area Network (WAN)). In various implementations, a device 130 includes a mobile communication device such as a smartphone, a tablet computer, and/or a laptop computer. In some implementations, the devices 130 are referred to as enterprise devices (e.g., when the devices 130 are associated with an enterprise).

In various implementations, the client device 20 manages the devices 130 via the device management system 200. In some implementations, the client device 20 includes a graphical user interface (GUI) 22 that is configured to receive user input from an operator (e.g., a human operator such as an administrator). In some implementations, the GUI 22 is configured to present information related to the management of the devices 130. In various implementations, the client device 20 synthesizes a subscription management request 50 based on the user input received via the GUI 22. The client device 20 transmits the subscription management request 50 to the device management system 200. In some implementations, the client device 20 receives a subscription management response 52 in response to transmitting the subscription management request 50. In some implementations, the GUI 22 displays information included in the subscription management response 52. In various implementations, the client device 20 and the device management system 200 communicate via a network (e.g., a public network such as portions of the Internet, and/or a private network).

In various implementations, an operator network 100 includes an operator entity 110 (e.g., operator entities 110-1, 110-2, 110-3 . . . ), and a network infrastructure 120 (e.g., network infrastructures 120-1, 120-2, 120-3 . . . ). In some implementations, the operator entity 110 serves as a gateway for the network infrastructure 120. For example, the operator entity 110 channels traffic between the network infrastructure 120 and a device that is external to the operator network 100. To that end, in some implementations, the operator entity 110 includes a gateway node. In various implementations, the operator entity 110 satisfies an operator network security criterion to shield the network infrastructure 120 from a device that is external to the operator network 100. For example, in some implementations, the operator entity 110 satisfies the operator network security criterion to shield the network infrastructure 120 from the device management system 200.

In various implementations, the network infrastructure 120 includes various network elements 122 (e.g., network elements 122-1 . . . 122-5). In some implementations, the network elements 122 include a set of interconnected physical network nodes (e.g., servers, routers, modems, etc.) that enable communication between the devices 130. For example, in some implementations, the network elements 122 control the flow of data packets between the devices 130. In various implementations, the network elements 122 include various components of cellular networks. In some implementations, the operator network 100 includes a Long-Term Evolution (LTE) network, and the network elements 122 include various components of a LTE network. For example, in some implementations, the network elements 122 include an eNodeB, a Home Subscriber Server (HSS), a Packet Data Network Gateway (P-GW), a serving gateway (S-GW), a Mobility Management Entity (MME), etc.

In various implementations, the operator entity 110 provides one or more network interfaces 112. In various implementations, a network interface 112 enables the device management system 200 to manage the devices 130 that are deployed (e.g., operating) on the operator network 100. For example, in some implementations, the network interfaces 112 enable the device management system 200 to view a list of devices 130 that are deployed on the operator network 100, change a subscription plan (e.g., a rate plan) for one or more devices 130, provision a new device 130 on the operator network 100, add/remove features (e.g., roaming, hotspot, etc.) from one or more devices 130, etc. In some implementations, different network interfaces 112 provide different functionality. For example, a first network interface 112 enables the device management system 200 to view the list of devices 130, a second network interface 112 enables the device management system 200 to make changes to the subscription plan, a third network interface 112 enables the device management system 200 to provision a new device 130, a fourth network interface 112 enables the device management system 200 to add/remove features, etc. As such, in some implementations, the device management system 200 selects one of the network interfaces 112 based on the subscription management request 50.

In various implementations, the network interfaces 112 include application programming interfaces (APIs). In some examples, the network interfaces 112 include representational state transfer (REST) APIs, and/or Simple Object Access Protocol (SOAP) APIs. In some implementations, a network interface 112 includes one or more application endpoints 114. In some implementations, an application endpoint 114 enables communication with the network infrastructure 120. In some implementations, an application endpoint 114 identifies an addressable location within the network infrastructure 120 (e.g., a particular network element 122). In such implementations, the application endpoint 114 enables communication with the addressable location. In some implementations, different application endpoints 114 enable communication with different addressable locations within the network infrastructure 120. For example, a first application endpoint 114 enables communication with the first network element 122-1, a second application endpoint 114 enables communication with the second network element 122-2, etc. In various implementations, the network interfaces 112 and/or the application endpoints 114 mask the network infrastructure 120 in order to shield the network infrastructure 120 from the device management system 200. In some implementations, shielding the network infrastructure 120 makes the network infrastructure 120 less vulnerable to security attacks. As such, in some implementations, shielding the network infrastructure 120 makes the network infrastructure 120, and the operator network 100, more secure and trustworthy.

In various implementations, the device management system 200 includes one or more front-facing interfaces 210, and one or more adaptor modules 220. In some implementations, the front-facing interfaces 210 enable communication between the client device 20 and the device management system 200. For example, the GUI 22 utilizes the front-facing interface(s) 210 to transmit the subscription management request 50, and/or to receive the subscription management response 52. In some implementations, the front-facing interfaces 210 include APIs (e.g., REST APIs). In various implementations, an adaptor module 220 enables communication between the device management system 200 and an operator network 100 that corresponds with the adaptor module 220. For example, in some implementations, a first adaptor module 220 enables communication with the first operator network 100-1, a second adaptor module 220 enables communication with the second operator network 100-2, and a third adaptor module 220 enables communication with the third operator network 100-3.

In various implementations, the network interfaces 112 and the front-facing interfaces 210 communicate differently. For example, in some implementations, the network interfaces 112 and the front-facing interfaces 210 utilize different communication formats and/or different communication protocols. As such, in various implementations, the network interfaces 112 are unable to interpret the subscription management request 50. In various implementations, the device management system 200 utilizes an adaptor module 220 to convert (e.g., translate) a subscription management request 50 into a network request 250 that conforms to the network interfaces 112. In other words, the network interfaces 112 are able to interpret the network request 250 because the network request 250 utilizes a communication format/protocol that corresponds with the network interfaces 112. In various implementations, the operator entity 110 (e.g., the network interfaces 112) provide a network response 252 in response to receiving the network request 250. The device management system 200 utilizes an adaptor module 220 (e.g., the same adaptor module 220 that converted the subscription management request 50 into the network request 250) to convert the network response 252 into the subscription management response 52. As such, the subscription management response 52 utilizes a communication format/protocol that corresponds with the front-facing interfaces 112, so that the client device 20 is able to interpret the subscription management response 52.

In various implementations, the device management system 200 determines correspondence between the subscription management request 50 and one of the adaptor modules 220. In some implementations, the device management system 200 selects one of the adaptor modules 220 based on an operator network 100 indicated in the subscription management request 50. For example, the device management system 200 selects the adaptor module 220 that corresponds with the operator network 100 indicated in the subscription management request 50. In some implementations, the device management system 200 makes a call (e.g., an API call, a subroutine call, etc.) to the selected adaptor module 220. In various implementations, the selected adaptor module 220 converts the subscription management request 50 into the network request 50.

In various implementations, the device management system 200 (e.g., the adaptor module 220) transmits the network request 50 to the operator network 100. In the example of FIG. 1, the device management system 200 transmits the network request 50 to the first operator network 100-1 (e.g., to the first operator entity 110-1). In various implementations, the device management system 200 transmits the network request 250 according to an operator network security criterion. For example, in some implementations, the device management system 200 transmits the network request 250 to a network interface 112 (e.g., to an application endpoint 114) instead of transmitting the network request 250 directly to a network element 122. In various implementations, the device management system 200 receives a network response 252 from the operator network 100 (e.g., from the operator entity 110). In various implementations, the device management system 200 receives the network response 252 according to an operator network security criterion. For example, in some implementations, the device management system 200 receives the network response 252 from a network interface 112 (e.g., from an application endpoint 114) instead of a network element 122. Since, in various implementations, the device management system 200 does not directly communicate with the network elements 122, the device management system 200 reduces a number of potential security attacks on the network elements 122.

In some implementations, the device management system 200 (e.g., the adaptor module 220) converts the network response 252 into the subscription management response 52.

As described herein, the client device 20 is able to interpret the subscription management response 52 because the subscription management response 52 conforms to a format/protocol associated with the front-facing interface 210 (e.g., instead of conforming to a format/protocol associated with the network interface 112). In some implementations, the device management system 200 transmits the subscription management response 52 to the client device 20. In some implementations, the client device 20 displays the subscription management response 52 via the GUI 22. In some implementations, the subscription management response 52 indicates a status of the subscription management request 50 (e.g., request received, request is being processed, request granted, request denied, etc.). In some implementations, the subscription management response 52 indicates whether an action requested in the subscription management request 50 has been completed (e.g., new devices have been provisioned, requested rate plan has been activated on the specified devices, operator network access has been disabled for the specified devices, etc.). In some implementations, the subscription management response 52 includes information requested by the subscription management request 50 (e.g., a list of devices 130 that are associated with the enterprise and are currently operating on the operator network 100, or a list of devices 130 that are associated with the enterprise and have a particular feature such as the roaming package, etc.).

In various implementations, the device management system 200 and the operator networks 100 are operated by different entities. For example, in some implementations, the device management system 200 is operated by a particular business entity (e.g., a device management company), whereas the operator networks 100 are operated by network service providers (e.g., cellular service providers). As such, in various implementations, the device management system 200 does not have access to the network infrastructure 120 of an operator network 100. For example, in some implementations, an operator network 100 does not trust the device management system 200 to access the network infrastructure 120 of the operator network 100. Hence, in such implementations, the operator network 100 masks the network infrastructure 120 in order to prevent the device management system 200 from directly accessing the network infrastructure 120. In various implementations, different operator networks 100 are operated by different entities. For example, in some implementations, the first operator network 100-1 is operated by one cellular service provider, whereas the second operator network 100-2 is operated by another cellular service provider. In various implementations, the operator networks 100 are referred to as third-party networks (e.g., because the device management system 200 and the operator networks 100 are managed by different parties).

Figure 2:
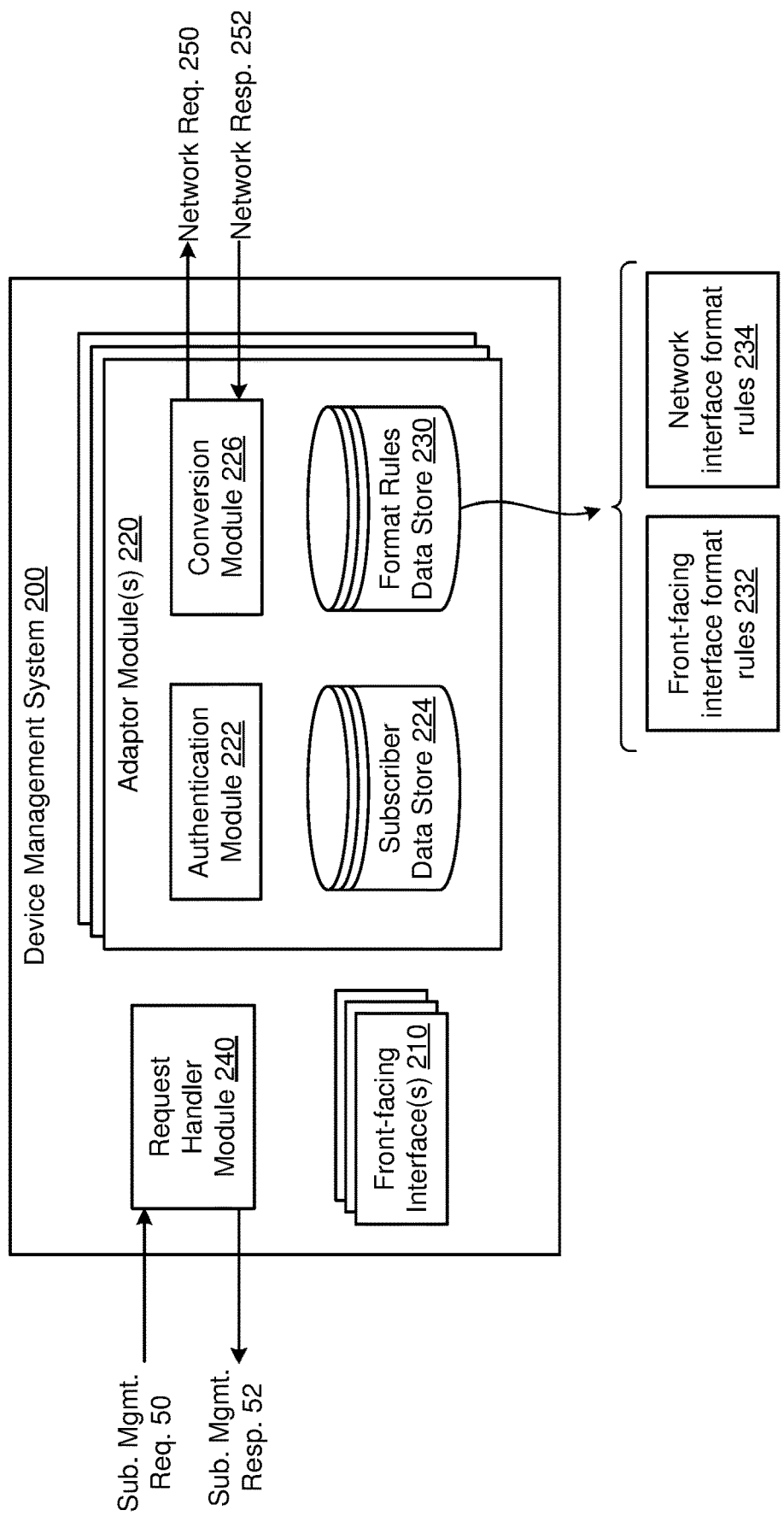
FIG. 2 is a block diagram of the device management system in accordance with some implementations.

FIG. 2 is a block diagram of the device management system 200 in accordance with some implementations. In various implementations, the device management system 200 includes one or more front-facing interfaces 210, one or more adaptor modules 220, and a request handler module 240. Briefly, a front-facing module 210 enables communication between the device management system 200 and the client device 20, an adaptor module 220 enables communication between the device management system 200 and a corresponding operator network 100, and the request handler module 240 handles (e.g., interprets and/or processes) requests (e.g., the subscription management request 50).

In various implementations, the request handler module 240 handles (e.g., interprets and/or processes) the subscription management request 50. In some implementations, the request handler module 240 receives the subscription management request 50 from the client device 20. In various implementations, the request handler module 240 interprets the subscription management request 50. For example, in some implementations, the request handler module 240 determines whether the subscription management request 50 relates to a particular operator network 100. In various implementations, the request handler module 240 determines correspondence between the subscription management request 50, and one of the adaptor modules 220 corresponding with an operator network 100 indicated in the subscription management request 50. In some implementations, the request handler module 240 selects one of the adaptor modules 220 based on the operator network 100 indicated in the subscription management request 50. In some implementations, the request handler module 240 makes a call to one of the adaptor modules 220 (e.g., the selected adaptor module 220) based on the operator network 100 indicated in the subscription management request 50. In some examples, the call to the selected adaptor module 220 includes the subscription management request 50.

In various implementations, an adaptor module 220 enables the device management system 200 to communicate with an operator network 100 (e.g., with an operator entity 110 of the operator network 100) that corresponds with the adaptor module 220. To that end, in various implementations, an adaptor module 220 includes an authentication module 222, a subscriber data store 224, a conversion module 226, and a format rules data store 230. Briefly, the authentication module 222 authenticates the subscription management request 50 based on information stored in the subscriber data store 224, and the conversion module 226 converts the subscription management request 50 into the network request 250 based on information stored in the format rules data store 230.

In various implementations, the authentication module 222 authenticates the subscription management request 50. For example, in some implementations, the authentication module 222 utilizes information from the subscriber data store 224 to determine whether the client device 20 is authorized to initiate the subscription management request 50. In some implementations, the subscriber data store 224 stores a list of client device identifiers (IDs) in association with operator network IDs of operator networks 100 (e.g., mobile network IDs of mobile networks). In such implementations, the authentication module 222 successfully authenticates the subscription management request 50 in response to determining that an operator network indicated in the subscription management request 50 is associated with the client device 20 that initiated the subscription management request 50. In various implementations, the authentication module 222 successfully authenticates the subscription management request 50 in response to determining that the client device 20 (e.g., the enterprise associated with the client device 20) has a subscription account for the operator network 100 indicated in the subscription management request 50.

In various implementations, the format rules data store 230 stores front-facing interface format rules 232. In some implementations, the front-facing interface format rules 232 specify a format for the subscription management request 50 and/or the subscription management response 52. For example, the front-facing interface format rules 232 specify specific data fields (e.g., a header field, etc.) for the subscription management request 50 and/or the subscription management response 52. In various implementations, the format rules data store 230 stores network interface format rules 234. In some implementations, the network interface format rules 234 specify a format for the network request 250 and/or the network response 252. For example, the network interface format rules 234 specify specific data fields (e.g., a header field, etc.) for the network request 250 and/or the network response 252.

In various implementations, the conversion module 226 converts the subscription management request 50 into the network request 250 based on the network interface format rules 234. For example, in some implementations, the conversion module 226 synthesizes a data container (e.g., a JavaScript Object Notation (JSON) object) that represents the network request 250. In such implementations, the conversion module 226 writes information from the subscription management request 50 into the data container according to the network interface format rules 234. For example, in accordance with the network interface format rules 234, the conversion module 226 includes specific data fields in the data container that the operator network 100 expects in the network request 250. In other words, in various implementations, the operator network 100 is configured to service (e.g., interpret and/or process) the network request 250, whereas the operator network 100 is not configured to service the subscription management request 50.

In various implementations, the conversion module 226 converts the network response 252 into the subscription management response 52 based on the front-facing interface format rules 232. For example, in some implementations, the conversion module 226 synthesizes a data container (e.g., a JSON object) that represents the subscription management response 52. In such implementations, the conversion module 226 writes information from the network response 252 into the data container according to the front-facing interface format rules 232. For example, in accordance with the front-facing interface format rules 232, the conversion module 226 includes specific data fields in the data container that the client device 20 expects in the subscription management response 52. In other words, in various implementations, the client device 20 is configured to process (e.g., interpret and/or display) the subscription management response 52, whereas the client device 20 is not configured to interpret the network response 252.

Figure 3:
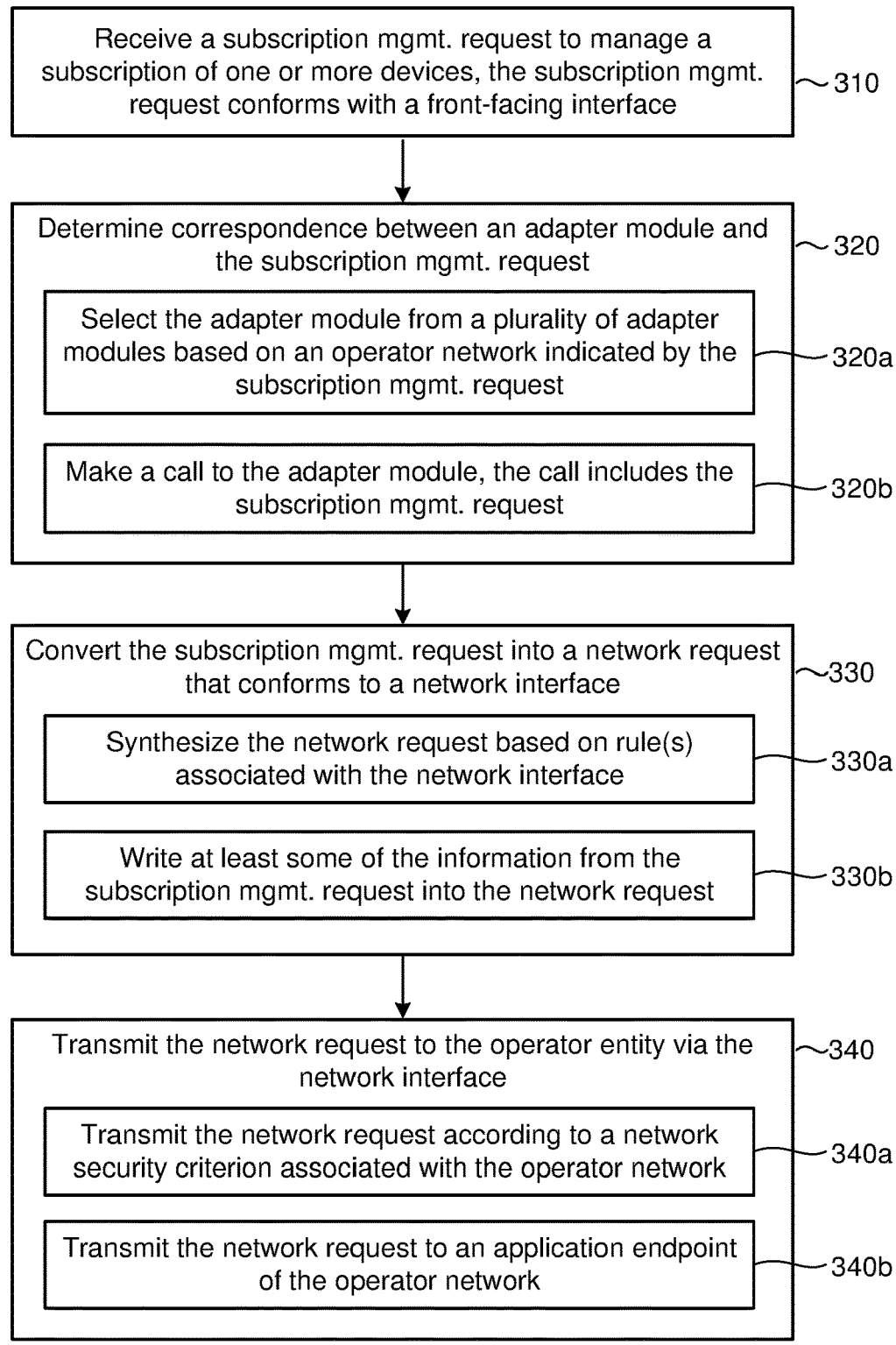
FIG. 3 is a flowchart representation of a method of managing device access on one or more operator networks in accordance with some implementations.

FIG. 3 is a flowchart representation of a method 300 of managing device access (e.g., mobile device access) on one or more operator networks (e.g., on one or more mobile networks such as cellular networks, permissioned Wi-Fi networks, LANs, and/or WANs) in accordance with some implementations. In various implementations, the method 300 is implemented as a set of computer readable instructions that are executed at a device management system (e.g., the device management system 200 shown in FIG. 2). Briefly, the method 300 includes receiving a subscription management request, determining correspondence between the subscription management request and an adaptor module, converting the subscription management request into a network request, and transmitting the network request to an operator entity.

As represented by block 310, in various implementations, the method 300 includes receiving a subscription management request (e.g., the subscription management request 50 shown in FIGS. 1 and 2). In some implementations, the subscription management request is to manage device access (e.g., mobile device access) on one or more operator networks (e.g., the operator networks 100 shown in FIG. 1). For example, in some implementations, the subscription management request is to manage a device subscription of one or more devices that are deployed on a particular operator network (e.g., one or more devices 130 deployed on the first operator network 100-1 shown in FIG. 1). As described herein, in some implementations, the subscription management request includes a request to change a rate plan of one or more devices. In some implementations, the subscription management request includes a request to add/remove features (e.g., roaming, voicemail, etc.) from one or more devices. In some implementations, the subscription management request includes a request to change (e.g., disable/enable/throttle) a network connectivity of one or more devices. In various implementations, the subscription management request is initiated by an enterprise (e.g., an administrator of the enterprise), and the subscription management request specifies one or more devices (e.g., enterprise devices) associated with the enterprise.

In various implementations, the method 300 includes receiving the subscription management request via the front-facing interface. In various implementations, the subscription management request conforms to a front-facing interface (e.g., the front-facing interface 210 shown in FIGS. 1 and 2). In some implementations, the subscription management request conforms to a front-facing interface format that is associated with the front-facing interface. In some implementations, the subscription management request conforms to front-facing interface format rules (e.g., the front-facing interface format rules 232 shown in FIG. 2) that are associated with the front-facing interface. For example, the subscription management request includes various data fields specified by the front-facing interface format rules. In various implementations, the subscription management request indicates an operator network. For example, in some implementations, the subscription management request includes an operator network ID that identifies the operator network. In various implementations, the method 300 includes authenticating the subscription management request. For example, in some implementations, the method 300 includes determining whether a client device that initiated the subscription management request is authorized to initiate the subscription management request. In some implementations, the method 300 includes determining whether an enterprise that initiated the subscription management request has a subscription account with the operator network indicated in the subscription management request.

As represented by block 320, in various implementations, the method 300 includes determining correspondence between the subscription management request and an adaptor module (e.g., a first adaptor module of a plurality of adaptor modules, for example, one of the adaptor modules 220 shown in FIGS. 1 and 2). As represented by block 320a, in various implementations, the method 300 includes selecting the adaptor module based on an operator network indicated in the subscription management request. In some implementations, each adaptor module corresponds with a different operator network. In such implementations, the method 300 includes selecting the adaptor module that corresponds with the operator network indicated by the subscription management request. As represented by block 320b, in various implementations, the method 300 includes making a call to the adaptor module. In some implementations, the call includes the subscription management request. In some implementations, making the call includes making an API call, a subroutine call, etc.

As represented by block 330, in various implementations, the method 300 includes converting, by the adaptor module, the subscription management request into a network request (e.g., the network request 250 shown in FIGS. 1 and 2). In various implementations, the network request conforms to a network interface (e.g., the network interface 112 shown in FIG. 1). In some implementations, the network request conforms to a network interface format associated with the network interface. In some implementations, the network interface is provided by an operator entity associated with an operator network (e.g., the operator entity 110 shown in FIG. 1). In various implementations, the network interface is configured to mask network elements (e.g., the network elements 122 shown in FIG. 1) of the operator network in order to prevent the device management system from directly communicating with the network elements. In various implementations, the network interface provides access to one or more application endpoints of the operator network (e.g., the application endpoints 114 shown in FIG. 1).

As represented by block 330a, in various implementations, the method 300 includes synthesizing the network request based on one or more network interface format rules (e.g., the network interface format rules 234 shown in FIG. 2). In some implementations, the method 300 includes instantiating a data container (e.g., JSON object) that represents the network request. As represented by block 330b, in various implementations, the method 300 includes writing information into the data container. In some implementations, the method 300 includes writing at least some of the information from the subscription management request into the data container that represents the network request.

As represented by block 340, in various implementations, the method 300 includes transmitting the network request to the operator entity via the network interface. As represented by block 340a, in various implementations, the method 300 includes transmitting the network request according to an operator network security criterion in order to shield the network infrastructure of the operator network from the device management system. In other words, in various implementations, the transmitting satisfies an operator network security criterion to shield the network elements of the operator network from the device management system. For example, as represented by block 340b, in some implementations, the method 300 includes transmitting the network request to an application endpoint (e.g., instead of transmitting the network request directly to a network element).

In some implementations, the method 300 includes selecting the application endpoint from various application endpoints based on a type of the network request. For example, in some implementations, the method 300 includes determining that the network request is to provision new devices on the operator network. In such implementations, the method 300 includes selecting an application endpoint that is associated with provisioning new devices on the operator network. In some implementations, the method 300 includes determining that the network request is to add/remove features from one or more devices associated with an enterprise. In such implementations, the method 300 includes selecting an application endpoint that is associated with adding/removing features. In some implementations, the method 300 includes determining that the network request is to view in-cycle data usage for one or more devices associated with an enterprise. In such implementations, the method 300 includes selecting an application endpoint that is associated with providing in-cycle data usage.

Figure 4:
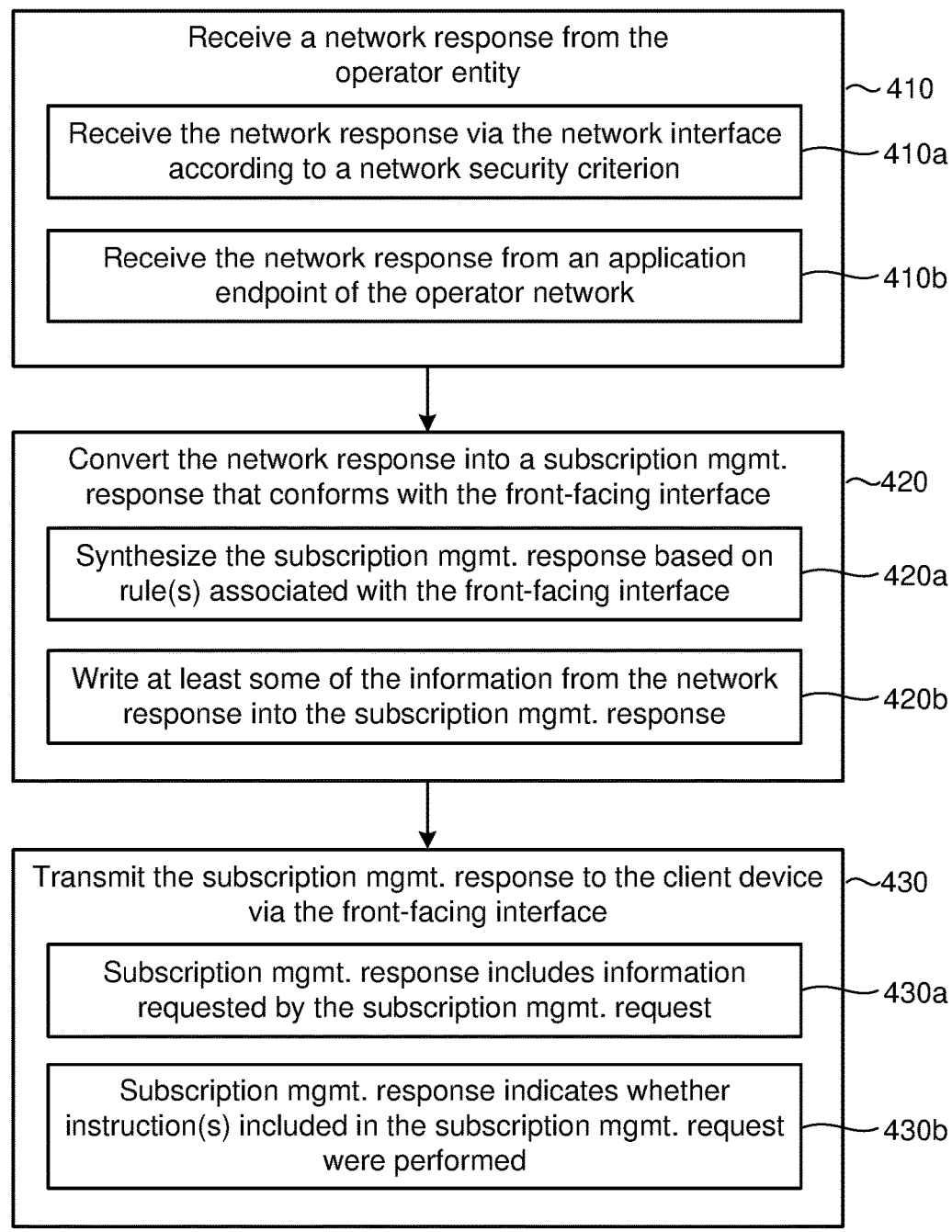
FIG. 4 is a flowchart representation of a method of managing device access on one or more operator networks in accordance with some implementations.

FIG. 4 is a flowchart representation of a method 400 of managing device access (e.g., mobile device access) on one or more operator networks in accordance with some implementations. In various implementations, the method 400 is implemented as a set of computer readable instructions that are executed at a device management system (e.g., the device management system 200 shown in FIG. 2). Briefly, the method 400 includes receiving a network response from an operator entity, converting the network response into a subscription management response, and transmitting the subscription management response to the client device.

As represented by block 410, in various implementations, the method 400 includes receiving a network response from an operator entity (e.g., the network response 252 shown in FIGS. 1 and 2). As represented by block 410a, in some implementations, the method 400 includes receiving the network response according to an operator network security criterion in order to shield the network infrastructure of the operator network from the device management system. In other words, in some implementations, the receiving satisfies an operator network security criterion to shield the network elements of the operator network from the device management system. As represented by block 410b, the method 400 includes receiving the network response from an application endpoint of the operator network (e.g., instead of receiving the network response directly from a network element). In various implementations, the method 400 includes receiving the network response via a network interface (e.g., the network interface 112 shown in FIG. 1). In various implementations, the network response conforms to the network interface. For example, in some implementations, the network response conforms to a network interface format that is associated with the network interface.

As represented by block 420, in various implementations, the method 400 includes converting, by an adaptor module, the network response into a subscription management response that conforms to the front-facing interface. As represented by block 420a, in some implementations, the method 400 includes synthesizing the subscription management response based on front-facing interface format rules associated with the front-facing interface. As represented by block 420b, in some implementations, the method 400 includes writing at least a portion of the information from the network response into the subscription management response. In some implementations, the method 400 includes selecting the adaptor module that corresponds with the operator network that transmitted the network response.

As represented by block 430, in various implementations, the method 400 includes transmitting the subscription management response to a client device via the front-facing interface. As represented by block 430a, in some implementations, the subscription management response includes information requested by the subscription management request. For example, in some implementations, the subscription management response includes in-cycle usage information for a set of devices associated with an enterprise. As represented by block 430b, in some implementations, the subscription management response indicates whether an action requested in the subscription management request has been completed. For example, in some implementations, the subscription management response indicates that a requested feature (e.g., voicemail) has been added to a set of devices associated with the enterprise, a particular feature (e.g., roaming) has been removed from a set of devices associated with the enterprise, a requested rate plan has been activated for the devices specified in the subscription management request, etc.

Figure 5:
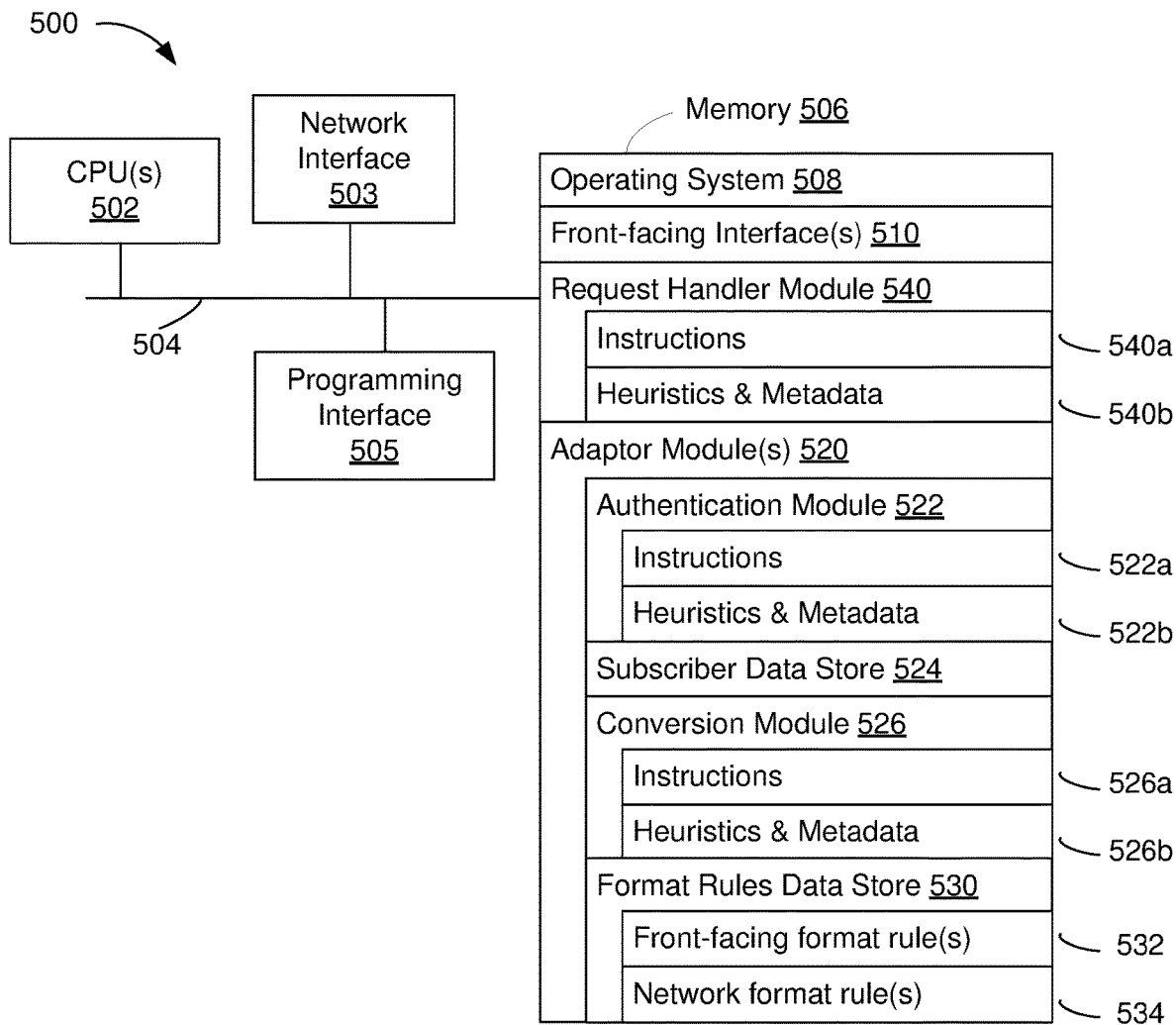
FIG. 5 is a block diagram of a server system enabled with various modules that are provided to manage device access on one or more operator networks in accordance with some implementations.

FIG. 5 is a block diagram of a server system 500 enabled with one or more components of a device management system (e.g., the device management system 200 shown in FIGS. 1 and 2) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 502, a network interface 503, a programming interface 505, a memory 506, and one or more communication buses 504 for interconnecting these and various other components.

In some implementations, the network interface 503 is provided to, among other uses, establish and maintain a metadata tunnel between a cloud hosted network management system and at least one private network including one or more compliant devices. In some implementations, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium.

In some implementations, the memory 506 or the non-transitory computer readable storage medium of the memory 506 stores the following programs, modules and data structures, or a subset thereof including an optional operating system 508, one or more front-facing interfaces 510, one or more adaptor modules 520, and a request handler module 540. In various implementations, the front-facing interface(s) 510, the adaptor module(s) 520 and the request handler module 540 are similar to the front-facing interface(s) 210, the adaptor module(s) 220 and the request handler module 240, respectively, shown in FIG. 2. In some implementations, the adaptor module 520 includes an authentication module 522, a subscriber data store 524, a conversion module 526, and a format rules data store 530. In various implementations, the authentication module 522, the subscriber data store 524, the conversion module 526, and the format rules data store 530 are similar to the authentication module 222, the subscriber data store 224, the conversion module 226, and the format rules data store 230, respectively, shown in FIG. 2. In some implementations, the format rules data store 530 includes front-facing interface format rules 532 and network interface format rules 534. In various implementations, the front-facing interface format rules 532 and network interface format rules 534 are similar to the front-facing interface format rules 232 and network interface format rules 234, respectively, shown in FIG. 2. In various implementations, the operating system 508 includes procedures for handling various basic system services and for performing hardware dependent tasks.

In various implementations, the request handler module 540 handles (e.g., receives, interprets and/or processes) a subscription management request from a client device. To that end, in various implementations, the request handler module 540 includes instructions and/or logic 540a, and heuristics and metadata 540b. In various implementations, the authentication module 522 authenticates the subscription management request (e.g., based on information stored in the subscriber data store 524). To that end, in various implementations, the authentication module 522 includes instructions and/or logic 522a, and heuristics and metadata 522b. In various implementations, the conversion module 526 converts the subscription management request into a network request based on the network interface format rules 534. In various implementations, the conversion module 526 converts a network response into subscription management response based on the front-facing interface format rules 532. To that end, in various implementations, the conversion module 526 includes instructions and/or logic 526a, and heuristics and metadata 526b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device management system that manages device access on a plurality of operator networks, wherein the device management system includes a non-transitory memory, and one or more processors:
   receiving a first request from a client device to manage a device subscription of one or more devices;
   determining, among the plurality of operator networks, a particular operator network indicated in the first request, wherein the particular operator network indicated in the first request is a first operator network on which the one or more devices are deployed;
   selecting, among a plurality of adapter modules, a first adapter module that corresponds to the first operator network;
   determining correspondence between the first adapter module and the first request, wherein the first request conforms to a first interface;
   converting, by the first adapter module, the first request into a second request that conforms to a second interface provided by an operator entity associated with the first operator network, wherein the operator entity is a different device than the device management system and the second interface masks network elements of the first operator network in order to prevent the device management system from directly communicating with the network elements; and
   transmitting the second request to the operator entity via the second interface, wherein the transmitting satisfies a first operator network security criterion to shield the network elements of the first operator network from the device management system.

2. The method of claim 1, further comprising:
   making a call to the first adapter module, wherein the call includes the first request.

3. The method of claim 1, wherein converting the first request into the second request comprises:
   synthesizing the second request based on one or more rules associated with the second interface, wherein the second request includes at least a portion of the information indicated by the first request.

4. The method of claim 1, wherein transmitting the second request comprises transmitting the second request to an application endpoint of the first operator network in order to satisfy the first operator network security criterion.

5. The method of claim 1, further comprising:
   authenticating the first request to determine at least one of:
   whether the client device is authorized to initiate the first request; and
   whether an enterprise associated with the one or more devices has a subscription account with the first operator network.

6. The method of claim 1, further comprising:
   transmitting a first response in response to the first request, wherein the first response conforms with the first interface.

7. The method of claim 6, wherein transmitting the first response comprises:
   receiving a second response from the operator entity in response to transmitting the second request to the operator entity, wherein the second response conforms with the second interface; and
   converting, by the first adapter module, the second response into the first response that conforms with the first interface.

8. The method of claim 7, wherein receiving the second response comprises:
receiving the second response from an application endpoint in order to satisfy the first operator network security criterion.

9. A device comprising:
a processor that executes computer readable instructions included on a non-transitory memory; and
a non-transitory memory including computer readable instructions, that when executed by the processor, cause the device to:
receive a first request from a client device to manage a device subscription of one or more devices;
determine, among a plurality of operator networks, a particular operator network indicated in the first request, wherein the particular operator network indicated in the first request is a first operator network on which the one or more devices are deployed;
select, among a plurality of adapter modules, a first adapter module that corresponds to the first operator network;
determine correspondence between the first adapter module and the first request, wherein the first request conforms to a first interface;
convert, by the first adapter module, the first request into a second request that conforms to a second interface provided by an operator entity associated with the first operator network, wherein the operator entity is a different device than the device management system and the second interface masks network elements of the first operator network in order to prevent the device management system from directly communicating with the network elements; and
transmit the second request to the operator entity via the second interface, wherein the transmitting satisfies a first operator network security criterion to shield the network elements of the first operator network from the device management system.

10. The device of claim 9, wherein the computer readable instructions further cause the device to:
make a call to the first adapter module, wherein the call includes the first request.

11. The device of claim 9, wherein converting the first request into the second request comprises:
synthesizing the second request based on one or more rules associated with the second interface, wherein the second request includes at least a portion of the information indicated by the first request.

12. The device of claim 9, wherein transmitting the second request comprises transmitting the second request to an application endpoint of the first operator network in order to satisfy the first operator network security criterion.

13. A device management system comprising:
a plurality of adapter modules;
a processor that executes computer readable instructions included on a non-transitory memory; and
a non-transitory memory including computer readable instructions, that when executed by the processor, cause the device management system to:
receive a first request from a client device to manage a device subscription of one or more devices;
determine, among a plurality of operator networks, a particular operator network indicated in the first request, wherein the particular operator network indicated in the first request is a first operator network on which the one or more devices are deployed;
select, among the plurality of adapter modules, a first adapter module that corresponds to the first operator network;
determine correspondence between the first adapter module and the first request, wherein the first request conforms to a first interface;
convert, by the first adapter module, the first request into a second request that conforms to a second interface provided by an operator entity associated with the first operator network, wherein the operator entity is a different device than the device management system and the second interface masks network elements of the first operator network in order to prevent the device management system from directly communicating with the network elements; and
transmit the second request to the operator entity via the second interface, wherein the transmitting satisfies a first operator network security criterion to shield the network elements of the first operator network from the device management system.

14. The device management system of claim 13, wherein the computer readable instructions further cause the device management system to:
authenticate the first request to determine at least one of:
whether the client device is authorized to initiate the first request; and
whether an enterprise associated with the one or more devices has a subscription account with the first operator network.

15. The device management system of claim 13, wherein the computer readable instructions further cause the device management system to:
transmit a first response in response to the first request, wherein the first response conforms with the first interface.

16. The device management system of claim 15, wherein transmitting the first response comprises:
receiving a second response from the operator entity in response to transmitting the second request to the operator entity, wherein the second response conforms with the second interface; and
converting, by the first adapter module, the second response into the first response that conforms with the first interface.

* * * * *